United States Patent [19]

Hayashi et al.

[11] 4,315,659
[45] Feb. 16, 1982

[54] VEHICULAR ANTI-SKID BRAKE DEVICE

[75] Inventors: Tsutomu Hayashi, Houya; Hidehiko Inoue, Ooi; Makoto Sato, Kamifukuoka, all of Japan

[73] Assignee: Honda Giken Kogyo Kabushiki Kaisha, Tokyo, Japan

[21] Appl. No.: 133,400

[22] Filed: Mar. 24, 1980

[30] Foreign Application Priority Data

Mar. 30, 1979 [JP] Japan .................................. 54-37986
Mar. 30, 1979 [JP] Japan .................................. 54-37987

[51] Int. Cl.$^3$ .............................................. B60T 8/02
[52] U.S. Cl. .............................. 303/116; 188/181 A; 303/119
[58] Field of Search .............. 303/116, 119, 115, 114, 303/113, 117, 10, 61–63, 68–69; 188/181 A

[56] References Cited

U.S. PATENT DOCUMENTS 3,910,643 10/1975 Kobashi et al. ..................... 303/114
3,922,021 11/1975 Every .................................. 303/116

Primary Examiner—Douglas C. Butler
Attorney, Agent, or Firm—Armstrong, Nikaido, Marmelstein & Kubovcik

[57] ABSTRACT

An improved vehicular anti-skid brake device in which a brake oil pressure generating device generates brake oil pressure in accordance with a braking operation input. A braking force applying device applies a braking force to wheels in response to the brake oil pressure generated in the brake oil pressure generating device. At the time of braking the wheels, a control device actuates immediately the brake oil pressure generating device so as to restrain generation of the brake oil pressure by the brake oil pressure generating device against the braking operation input when the braking force to the wheels by the braking force applying device is excessive. The anti-skid brake device of the present invention is high in reliability of operation, has a good response in braking sense, can overcome difficulty in mounting and arranging the device on the vehicle, simplifies an oil passage arrangement required for the anti-skid control. It can easily be applied to conventional general brake devices without considerable change in structure thereof.

2 Claims, 3 Drawing Figures

VEHICULAR ANTI-SKID BRAKE DEVICE

BACKGROUND OF THE INVENTION

The present invention relates to a vehicular anti-skid brake device which can be actuated so as to suppress generation of braking oil pressure by means of a braking oil pressure generating device when the braking force to the wheels is excessive.

Conventional anti-skid brake devices typically comprise a braking oil pressure generating device, for example, such as a master cylinder for generating braking oil pressure in accordance with a braking operating input, a braking force applying device, for example, such as a brake actuated by means of a wheel cylinder for applying the braking force to the wheels in response to braking oil pressure generated by said braking oil pressure generating device, and an anti-skid control device for controlling the magnitude of the braking force to the wheels. Such anti-skid brake devices have been usually designed so as to suppress the braking operation of the braking force applying device to the wheels against the braking oil pressure generated by the braking oil pressure generating device when the braking force to the wheels is excessive, that is, when the possibility or danger of locking the wheels occurs.

However, in such conventional anti-skid brake devices as described above, the anti-skid control device is provided to directly control the operation of the braking force applying device but not to directly control the braking oil pressure generating device, and thus, even if the anti-skid control device is actuated as a result of the excessive braking operating input, a vehicle operator merely can sense that the anti-skid control device has been actuated through an oil passage to provide communication between the braking oil pressure generating device and the braking force applying device. Generally speaking, it is not easy to sense immediately that the anti-skid control device has been actuated and it tends to involve a time delay from the actuation of the anti-skid control device to sensing thereof, so that it is difficult to fully expect the responsiveness of the operator to the actuation of the anti-skid control device as a result of the excessive braking operating input. Moreover, in vehicles, for example, such as motorcycles which particularly call for the responsiveness of the driver to the excessive braking force, it is very important to let the driver rapidly and positively sense the fact that the anti-skid control device has been actuated.

In addition, in small vehicles such as motorcyles particularly involving many limitations in locations where various devices are mounted, there is much difficulty in mounting and arranging the anti-skid control mechanism as far as the anti-skid brake device of the prior art type is employed.

SUMMARY OF THE INVENTION

It is, therefore, a primary object of the present invention to provide a vehicular anti-skid brake device which can positively achieve the anti-skid control to provide high reliability, which is high in response in the braking sense in the event the anti-skid control device is actuated. The device is also intended to overcome the difficulty in mounting and arranging the device on the vehicle, and simplifying the oil passage arrangement required for the anti-skid control. It is also an object that the device can be easily applied to conventional braking devices without considerably changing the structure thereof.

Furthermore, in the anti-skid brake device of the type in which the magnitude of the braking force to the wheels is controlled in accordance with the controlling operation of a control oil pressure cylinder, a control oil chamber within the control oil pressure cylinder normally communicates with an oil tank. However, when the braking force to the wheels by the braking force applying device is excessive, communication with the oil tank is cut off by the actuation of the control device and control oil pressure in excess of a given pressure, so as to oppose the braking operating input, can be maintained. In this case, when the braking force to the wheels is particularly excessive, the control oil pressure generated in the control oil pressure generating device is positively transmitted into the control oil chamber.

Incidentally, the control oil chamber normally communicates with the oil tank so that in vehicles, for example, such as motorcycles which have many limitations in mounting and arrangement of various devices such as the control oil pressure cylinder, the control oil pressure generating device and the like, then if the control oil chamber within the control oil pressure cylinder is arranged in a level higher to some extent than that of the oil tank of the control oil pressure generating device, oil pressure within the control oil chamber and within the oil passage to provide a communication between the control oil chamber and the oil tank is reduced more than as needed due to vibrations of the vehicle and sliding motion of a piston responsive to control oil pressure within the control oil pressure cylinder. As a result, cavities tend to be formed within the control oil chamber and within the oil passage to provide a communication between the control oil chamber and the oil tank. Under normal conditions, even when the anti-skid control device begins to be actuated because of the excessive braking force to the wheels to cut off the control oil chamber from the oil tank so as to maintain the control oil pressure within the control oil chamber in a level more than a given pressure, it is not possible to rapidly increase the control oil pressure within the control oil chamber to a level more than a given pressure if the cavities are formed in the control oil chamber and the oil passage to provide a communication between the control oil chamber and the oil tank. As a consequence, it becomes difficult to expect rapid anti-skid control.

It is another object of the present invention to provide an anti-skid brake device which can eliminate formation of cavities within the control oil chamber and within the oil passage to provide a communication between the control oil chamber and the oil tank even if the control oil chamber of the control oil pressure cylinder is arranged in a level higher than the oil tank which is normally in a communication state.

The above and other objects, features and advantages of the invention will become apparent from the following detailed description when taken in conjunction with the accompanying drawings which illustrate a few embodiments of the invention.

DESCRIPTION OF THE PREFERRED EMBODIMENTS

Figure 1:
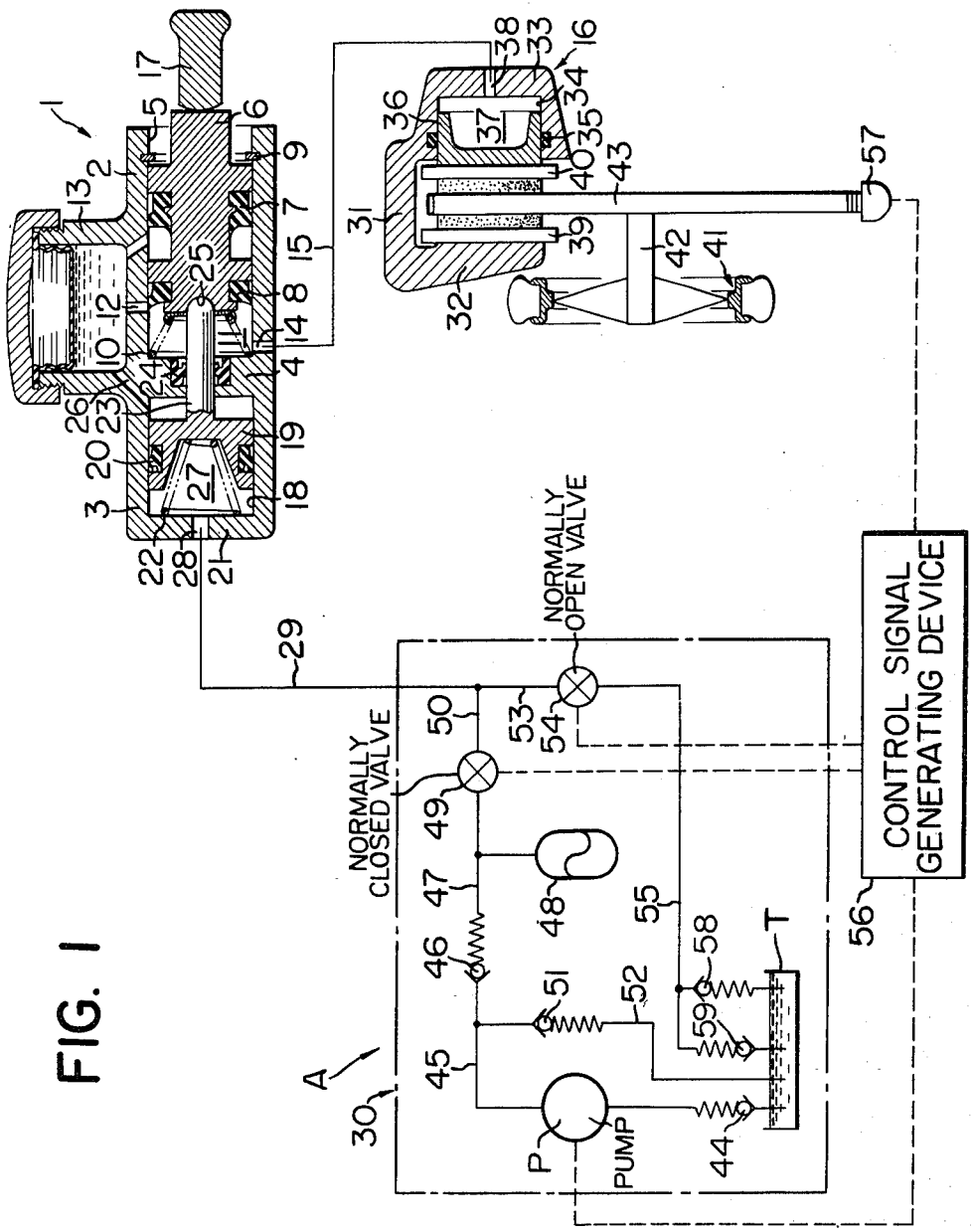
FIG. 1 is an overall hydraulic circuit, with a main part shown in section on an enlarged scale, of one embodiment of a vehicular anti-skid brake device in accordance with the present invention.

Referring now to FIG. 1, there is shown a brake oil pressure generating device 1 which comprises a brake oil pressure generating cylinder 2 and a control oil pressure cylinder 3 adjacent to each other through a partition 4 on a common axis. The brake oil pressure generating cylinder 2 has a cylindrical chamber 5 within which a brake oil pressure generating piston 6 is fitted in axial slidable contact between the partition 4 and a stopper member 9 secured to the inner peripheral surface of the cylindrical chamber 5 through seal members 7 and 8. The brake oil pressure generating piston 6 is normally biased towards the stopper member 9 by means of a bias spring 10 interposed between the partition 4 and the brake oil pressure generating piston 6. The outer end of the brake oil pressure generating piston 6 bears on a braking operating input transmission member 17 so that when the driver takes braking operation at the time of braking, the brake oil pressure generating piston 6 receives, accordingly, a biasing force in a direction opposing to the biasing force of the bias spring 10 through the braking operating input transmission member 17. A brake oil pressure generating chamber 11 is formed the partition 4 and the brake oil pressure generating cylinder 2 within the cylindrical chamber 5. The brake oil pressure generating chamber 11 receives through a port 12, brake oil from an oil tank 13 formed adjacent the brake oil pressure generating cylinder 2, and transmits through a port 14 and an oil passage 15 brake oil pressure generated within the brake oil pressure generating chamber 11 to a braking force applying device 16.

Within a cylindrical chamber 18 of the control oil pressure cylinder 3, a control oil pressure responsive piston 19 is fitted in axially slidable contact through a seal member 20. A rod 23 of the control oil pressure responsive piston 19 integrally axially projected from the end on the side of the partition 4 extends through the partition 4 through a seal member 24 and thence into the brake oil pressure generating chamber 11. The control oil pressure responsive piston 19 is normally biased towards the partition 4 by means of a bias spring 22 interposed between the control oil pressure responsive piston 19 and an end wall 21 of the control oil pressure cylinder 3. A foremost end of the rod 23 bears, accordingly, on a concave portion 25 formed in the inner end of the brake oil pressure generating piston 6. Within the cylindrical chamber 18, a cylindrical chamber between the control oil pressure responsive piston 19 and the partition 4 is connected with the oil tank 13 through a port 26, and a cylindrical chamber between the control oil pressure responsive piston 19 and the end wall 21 forms a control oil chamber 27 in communication with a control oil pressure generating device 30 of a control device A through a port 28 and an oil passage 29.

A body 31 of the braking force applying device 16 has a pair of legs 32 and 33, and within a cylindrical chamber 34 formed in one leg 33, a brake oil pressure responsive piston 36 is fitted in axially slidable contact through a seal member 35. A brake oil chamber 37 is formed between the brake oil pressure responsive piston 36 and an end wall of the cylindrical chamber 34. The brake oil chamber 37 is placed in communication with the brake oil pressure generating chamber 11 through a port 38, the oil passage 15 and the port 14. The leg 32 has a brake pad 39 mounted thereon and the brake oil pressure responsive piston 36 has a brake pad 40. The pair of brake pads 39 and 40 cooperate to press a brake disc 43, which is secured to an axle 42 of a wheel 41 and rotates with the wheel 41, from both surfaces thereof.

While the braking force applying device 16 shown in FIG. 1 is one example of well-known so-called disc brake devices, it should be understood in the present invention, that in addition to the disc brake device as shown in FIG. 1, other suitable hydraulically operated braking force applying devices may be employed. However, in the case the disc brake device as the braking force applying device is employed in the present invention, it is possible to expect an automatic adjusting function with respect to change in braking function caused by wear of each of the brake pads 39 and 40.

Next, the control device A will be described.

The control device A comprises the control oil pressure generating device 30 and a control signal generating device 56. In the control oil pressure generating device 30, control oil is sucked by a pump P from an oil tank T through a check valve 44 and is delivered therefrom under pressure to the oil passage 29 via an oil passage 45, a check valve 46, an oil passage 47, and an accumulator 48, a normally closed control valve 49 and an oil passage 50 in that order. The control oil fed to the oil passage 29 is further fed into the control oil chamber 27 through the port 28. During that period, extra oil within the oil passage 45 is returned to the oil tank T through a relief valve 51 and an oil passage 52. An oil passage 53 branched from the oil passage 50, is placed in communication with the oil tank T through a normally open control valve 54, an oil passage 55, and a pair of unidirectional valves 58, 59, which are interposed in parallel with each other and permit control oil to flow only in a reverse direction of each other.

The control signal generating device 56 is provided to operate, by calculating acceleration of the wheel 41 on the basis of the peripheral speed of the wheel 41 detected by a wheel speed detector 57 and by estimating the vehicle speed, to feed a control signal to the pump P, the normally closed control valve 49 and the normally open control valve 54 in accordance with the rotating condition of the wheel 41. The normally closed control valve 49 is normally placed in closed state and the normally open control valve 54 placed in open state so that the control oil chamber 27 is in communication with the oil tank T through the pair of unidirectional valves 58 and 59. However, when the possibility of locking the wheel 51 occurs, the normally closed control valve 49 in placed in closed state and the normally open control valve 54 is also placed in closed state so that the control oil within the control oil chamber 27 is placed in blocked state. When the danger of locking the wheel 41 occurs, the normally closed control valve 49 is placed in open state and the normally open control valve 54 is placed in closed state so that the control oil fed from the pump P is introduced under pressure into the control oil chamber 27. At this time, rotation of the pump P is controlled in speed in accordance with the rotating condition of the wheel 41.

While the illustrated brake oil pressure generating device 1 is designed so that the brake oil pressure generating cylinder 2 and the control oil pressure cylinder 3 are connected integral with each other, it should be understood that the brake oil pressure generating cylinder 2, the control oil pressure cylinder 3 and the control oil pressure generating device 30 may be designed moreover, so as to integrally connect also the control oil pressure generating device 30 to form a unitary body while adjoining integral with one another. This arrangement simplifies the structure of oil passages, minimizes actual piping, and facilitates mounting with respect to the vehicle.

With the anti-skid brake device shown in FIG. 1 constructed as described above, when the braking operating is effected by the driver, its braking operating input is transmitted to the brake oil pressure generating piston 6 as the biasing force of the braking operation input transmission member 17 with respect to the brake oil pressure generating piston 6. Since the control oil chamber 27 is in communication with the oil tank T brake oil pressure corresponding to the magnitude of the braking operation input is generated within the brake oil pressure generating chamber 11, and the brake oil pressure is transmitted to the braking force applying device 16. The wheels 41 receive the braking force of the magnitude corresponding to the braking operation input.

Out of the pair of unidirectional valves 58, 59, the unidirectional valve 58 for allowing a flow of control oil from the control oil chamber 27 towards the oil tank T is provided, when braking is effected, to return control oil discharged from the control oil chamber 27 into the oil tank T. It is effective to maintain the oil pressure within the control oil chamber 27 and within the oil passages 29, 53 and 55 to provide communication between the control oil chamber 27 and the oil tank T at a level as low as possible to the extent that a cavity is not formed. On the other hand, the unidirectional cable 59 for allowing a flow of control oil from the oil tank T towards the control oil chamber 27 is effective to freely supply control oil from the oil tank T into the control oil chamber 27 and into the oil passages 29, 53 and 55 to provide communication between the control oil chamber 27 and the oil tank T as the control oil pressure responsive piston 19 returns by being biased by the bias spring 22.

When the possibility of locking the wheels 41 occurs, the normally closed control valve 49 is placed in closed state, and the normally open valve 54 is also placed in closed state in accordance with the control signal generated by the control signal generating device 56 so that the control oil within the control oil chamber 27 is blocked, and the control oil pressure responsive piston 19 suppresses further movement of the brake oil pressure generating piston 6 through the rod 23. As a result, the brake oil pressure within the brake oil pressure generating chamber 11 does not increase even if the braking operating input further increases, and the braking force to the wheels 41 is maintained at a level below a predetermined magnitude so as not to increase further.

In addition, when the danger of locking the wheels 41 resulting from further increase in the braking force to the wheels 41 occurs, the normally closed control valve 49 is placed in open state and the normally open control valve 54 placed in closed state in accordance with the control signal generated by the control signal generating device 56 in a manner similar to the previous case, so that the control oil delivered from the pump P is introduced under pressure into the control oil chamber 27 and the control oil pressure responsive piston 19 is urged by the control oil thereby to urge and move through the rod 23, the brake oil pressure generating piston 6 in a direction opposing the braking operation input. As a consequence, the brake oil pressure within the brake oil pressure generating chamber 11 decreases, and the braking force to the wheels 41 decreases accordingly, irrespective of the braking operation input. At this time, the pump P is controlled in accordance with the control signal fed from the control signal generating device 56 to maintain pressure of control oil applied to the control oil chamber 27 at a required and proper level.

It is to be noted that in rotating and controlling the pump P, it is possible to form a control system so that the pump P is normally not rotated but begins to rotate at the same time the braking operation is effected by the driver, and again stops rotation as the braking operation terminates.

Figure 2:
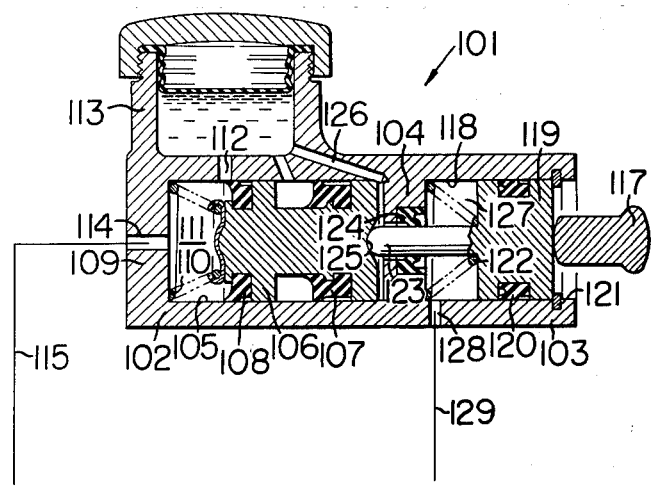
FIG. 2 is a longitudinal sectional view showing an embodiment, different from FIG. 1, of a part of a brake oil pressure generating device.

In FIG. 2, there is shown one example of a brake oil pressure generating device designed so that a brake oil pressure generating piston receives the biasing force of a braking operation input transmission member through a control oil pressure responsive piston.

A brake oil pressure generating device 101 comprises a brake oil pressure generating cylinder 102 and a control oil pressure cylinder 103 adjacent to each other through a partition 104 on a common axis, the brake oil pressure generating cylinder 102 having a cylindrical chamber 105 within which a brake oil pressure generating piston 106 is fitted in axially slidable contact through seal members 107 and 108. The brake oil pressure generating piston 106 is normally biased towards the partition 104 by means of a bias spring 110 interposed between said brake oil pressure generating piston 106 and an end wall 109 of the brake oil pressure generating cylinder 102. Within the brake oil pressure generating cylinder 102, a cylindrical chamber between the brake oil pressure generating piston 106 and the partition 104 is open to the oil tank 113 through a port 126, and a cylindrical chamber between the brake oil pressure generating piston 106 and the end wall 109 forms a brake oil pressure generating chamber 111. The brake oil pressure generating chamber 111 receives through a port 112 brake oil from an oil tank 113 formed adjacent the side wall portion of the brake oil pressure generating cylinder 102 and transmitting through a port 114 and an oil passage 115 brake oil pressure generated within the brake oil pressure generating chamber 111 to the braking force applying device 16 as shown in FIG. 1, for example.

Within a cylindrical chamber 118 of the control oil pressure cylinder 103, a control oil pressure responsive piston 119 is fitted in axially slidable contact between the partition 104 and a stopper member 121 secured to the inner wall surface of the cylindrical chamber 118 through a seal member 120. A rod 123 integrally projected from the inner end of the control oil pressure responsive piston 119 toward the partition 104 extends through the partition 104 through a seal member 124 in slidable contact fashion, and a foremost end of the rod 123 bears on a concave portion 125 formed in the end of the brake oil pressure generating piston 106. The control oil pressure responsive piston 119 is normally biased towards the stopper member 121 by means of a bias spring 122 interposed between the control oil pressure responsive piston 119 and the partition 104 and at the time of braking, receives the biasing force towards the partition 104 through the braking operation input transmission member 117. A cylindrical chamber between the control oil pressure responsive piston 119 and the partition 104 forms a control oil chamber 127, which is in communication with the control oil pressure generating device 30 as shown in FIG. 1, for example, through a port 128 and an oil passage 129.

With the brake oil pressure generating device 101 shown in FIG. 2 constructed as described above, the control oil chamber 127 is normally in communication with the oil tank T so that the brake oil pressure generating piston 106 freely receives a braking operation input through the braking operation input transmission member 117 and the brake oil responsive piston 119. The brake oil pressure corresponding to the braking operation input is generated within the brake oil pressure generating chamber 111. The brake oil pressure is transmitted to the braking force applying device 16 through the port 114 and the oil passage 115. When the possibility of locking the wheels occurs, the control device is actuated to block control oil within the control oil chamber 127 whereby the control oil pressure responsive piston 119 is restrained in further movement towards the partition 104. With this, the brake oil pressure generating piston 106 stops its further movement, and brake oil pressure within the brake oil pressure generating chamber 111 is limited to a level below a predetermined value even if the braking operation input further increases. When the danger of locking the wheels occurs, the control device is actuated so that control oil generated by the control oil pressure generating device 30 is introduced under pressure into the control oil chamber 127 through the oil passage 129 and the port 128. As a result, the control oil pressure responsive piston 119 is withdrawn toward the stopper member 121 against the braking operating input, and accordingly, the brake oil pressure generating piston 106 is also withdrawn towards the partition 104 by being biased by the bias spring 110. As a consequence, the brake oil pressure within the brake oil pressure generating chamber 111 decreases irrespective of the magnitude of the braking operation input.

Figure 3:
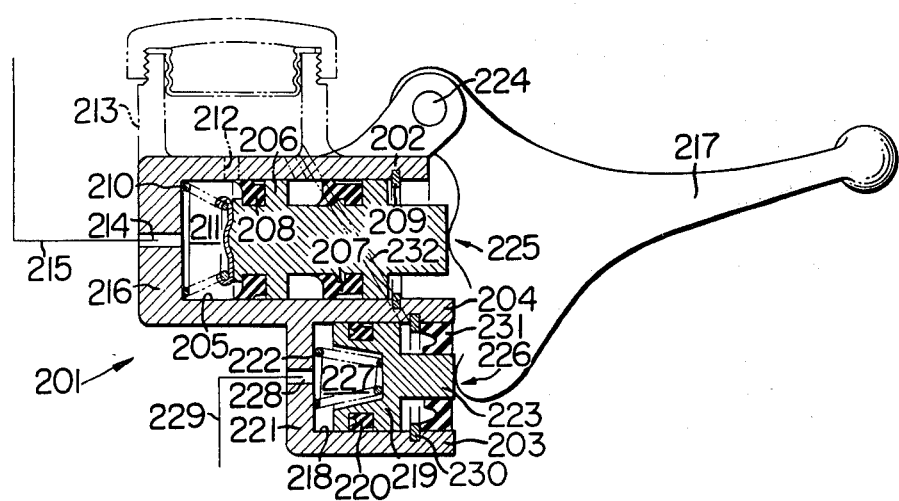
FIG. 3 is a longitudinal sectional view showing a further embodiment of the part of the brake oil pressure generating device.

In FIG. 3, there is shown one example of a brake oil pressure generating device wherein a brake oil pressure generating cylinder and a control oil pressure cylinder are disposed adjacent to each other in parallel fashion.

A brake oil pressure generating device 201 comprises a brake oil pressure generating cylinder 202 and a control oil pressure cylinder 203 which are open in the same direction and disposed adjacent to each other in parallel fashion through a side wall 204. The brake oil pressure generating cylinder 202 has a cylindrical chamber 205 within which a brake oil pressure generating piston 206 is fitted in axially slidable contact between an end wall 216 of the brake oil pressure generating cylinder 202 and a stopper member 209 secured to the inner peripheral wall of the brake oil pressure generating cylinder 202, through seal members 207 and 208. The brake oil pressure generating piston 206 is normally biased toward the stopper member 209 by means of a bias spring 210 interposed between the brake oil pressure generating piston 206 and the end wall 216. The outer end of the brake oil pressure generating piston 206 bears on a portion 225 of a braking operation input transmission member 217 pivotally supported on a pivot 224 of the brake oil pressure generating cylinder 202. At the time of braking, the braking operation input transmission member 217 is rotated clockwise so that the brake oil pressure generating piston 206 may receive a biasing force in a direction opposing the biasing force of the bias spring 210 through the braking operation input transmission member 217. A cylindrical chamber between the brake oil pressure responsive piston 206 and the end wall 216 forms a brake oil pressure generating chamber 211, which receives a supply of brake oil through the port 212 from an oil tank 213 formed adjacent the brake oil generating cylinder 202, and transmits through a port 214 and an oil passage 215 brake oil pressure generated within the brake oil pressure generating chamber 211 to the braking force applying device 16 as shown in FIG. 1, for example.

Within a cylindrical chamber 128 of the control oil pressure cylinder 203, a control oil pressure responsive piston 219 is fitted in axially slidable contact between an end wall 221 of the control oil pressure cylinder 213 and a stopper member 230 secured to the inner peripheral surface of the control oil pressure cylinder 203 through a seal member 220. The control oil pressure responsive piston 219 is normally biased towards the stopper member 230 by means of a bias spring 222 interposed between the control oil pressure responsive piston 219, and a foremost end of a rod 223 projected outwardly from the outer end of the control oil pressure responsive piston 219 bearing on a portion 226 of the braking operation input transmission member 217. A cylindrical chamber between the control oil pressure responsive piston and the end wall 211 forms a control oil chamber 227, which is in communication with the control oil pressure generating device 30 as shown in FIG. 1, for example, through a port 228 and an oil passage 229. Between the outer or back side face of the piston 219 and an end seal member 230 is defined a hydraulic chamber which is in communication with the oil tank 213 through a passage 232 formed in the wall of the cylinder chamber 205.

In the control oil pressure generating device 201 constructed as shown in FIG. 3, the seal member of the control oil pressure responsive piston 219 around the rod 223, such as the seal member 24 shown in FIG. 1 and the seal member 124 shown in FIG. 2, is not required. The relative size of the control oil pressure cylinder 203 to the brake oil pressure generating cylinder 202 may be selected suitably. In addition, the control oil pressure cylinder 203 may be disposed adjacent the brake oil pressure generating cylinder 202 without considerable change in design of the brake oil pressure generating cylinder 202 of the prior art type.

With the brake oil pressure generating device 201 shown in FIG. 3 constructed as described above, the control oil chamber 227 is normally in communication with the oil tank so that the brake oil pressure generating piston 206 freely receives a braking operation input through the braking operation input transmission member 217. Brake oil pressures corresponding to the braking operation input is generated within the brake oil pressure generating chamber 211. The brake oil pressure is transmitted to the braking force applying device 16 through the port 214 and the oil passage 215. When the possibility of locking the wheels occurs, the control device is actuated to block control oil within the control oil chamber 227 whereby the braking operation input transmission member 217 is restrained in further rotation in clockwise direction. With this, the brake oil pressure generating piston 206 stops its further movement, and brake oil pressure within the brake oil pressure generating chamber 211 is limited to a level below a predetermined value even if the braking operation input further increases. When the danger of locking the wheels occurs, the control device is actuated so that control oil generated by the control oil pressure generating device 30 is introduced under pressure into the control oil chamber 227 through the oil passage 229 and the port 228. As a result, the braking operation input transmission member 217 is rotated counterclockwise against the braking operation input. Accordingly, the brake oil pressure generating piston 206 is also withdrawn towards the stopper member 209 by being biased by the bias spring 210. As a consequence, the brake oil pressure within the brake oil pressure generating chamber 211 decreases irrespective of the magnitude of braking operation input.

It should be noted that the brake oil pressure generating cylinder 202 and the control oil pressure cylinder 203 are not necessarily disposed adjacent to each other as shown in FIG. 3 but they may be arranged about the pivot 224 in spaced relation.

In accordance with the present invention, as described above, the control device for controlling the magnitude of the braking force to the wheels is provided and designed so as to control actuation of the brake oil pressure generating device in such a manner that, when the braking force to the wheels is excessive, generation of control oil pressure by the brake oil pressure generating device is restrained. With this arrangement, it is possible to provide a vehicular anti-skid brake device which can positively achieve the anti-skid brake control operation with high reliability, which is high in response in braking sense in the event the anti-skid control device is actuated. This can overcome the difficulty in mounting and arranging the device on the vehicle, and can simplify the oil passage arrangement for the anti-skid control. It can easily be applied to conventional braking devices without considerable change in structure thereof.

In addition, the present invention may provide an anti-skid brake device wherein the control oil pressure generating device comprising a first oil passage system for communicating the pump with the control oil pressure cylinder and a second oil passage system for communicating the control oil pressure cylinder with the oil tank, the second oil passage system having a normally open control valve disposed in the midst thereof. This valve is normally placed in open state but placed in closed state when the braking force to the wheels is excessive. A pair of unidirectional valves interposed in parallel fashion between the normally open valve and the oil tank allow a flow of control oil only in a reverse direction to each other, whereby even if control oil in the control oil pressure cylinder is higher in level than the oil tank, there is produced no cavity within the control oil chamber and within the oil passage to provide communication between the control oil chamber and the oil tank. At the time of anti-skid control, it is possible to increase the control oil pressure within the control oil chamber quickly to a level above a predetermined pressure, resulting in an achievement of quick anti-skid control.

What is claimed is:

1. An anti-skid brake device comprising brake oil pressure generating means including a brake oil pressure generating cylinder for generating brake oil pressure in accordance with a braking operation input and a control oil pressure cylinder responsive to the brake oil pressure to be actuated to restrain generation of brake oil pressure by said brake oil pressure generating cylinder when said brake oil pressure is transmitted; braking force applying means for applying a braking force to wheels in response to brake oil pressure generated by said brake oil pressure generating cylinder; and control oil pressure generating means for immediately actuating said control oil pressure cylinder so as to restrain generation of the brake oil pressure by said brake oil pressure generating cylinder against said braking operation input when the braking force of said braking force applying means to the wheels is excessive, said control oil pressure generating means comprising a first oil passage system for communicating a pump as a control oil pressure generating source with said control oil pressure cylinder and a second oil passage system for communicating said control oil pressure cylinder with an oil tank, said second oil passage system having a normally open valve disposed in the midst thereof, said valve being normally placed in open state but placed in closed state when the braking force to the wheels is excessive, and a pair of unidirectional valves for allowing flow of control oil only in a reverse direction to each other and being interposed in parallel between said normally open control valve and said oil tank.

2. A vehicular anti-skid brake device comprising: brake oil pressure generating means for generating brake oil pressure in accordance with a braking operation input; braking force applying means for applying a braking force to wheels in response to the brake oil pressure generated in said brake oil pressure generating means; and control means operative at the time of braking the wheels for immediately actuating said brake oil pressure generating means so as to restrain generation of the brake oil pressure by said brake oil pressure generating means against said braking operation input when the braking force to the wheels by said braking force applying means is excessive; said brake oil pressure generating means comprising a brake oil pressure generating cylinder housing, a brake oil pressure generating piston in said cylinder housing to generate brake oil pressure, a control oil pressure cylinder housing with a control oil pressure responsive piston for limiting movement of said brake oil pressure generating piston in response to control oil pressure generated in said control means, said control means comprising a control signal generating means for generating a control signal in accordance with input information related to a rotating state of wheels, and control oil pressure generating means for generating control oil pressure in accordance with the control signal generated in said control signal generating means to transmit said control oil pressure to said control oil pressure cylinder; said brake oil pressure generating cylinder and said control oil pressure cylinder being disposed in parallel with each other, said brake oil pressure generating piston and said control oil pressure responsive piston being arranged to directly receive a biasing force of a braking operation input transmission member whose displacement is controlled by said brake oil pressure responsive piston.

* * * * *